Fig.1.

Dec. 16, 1952 H. W. MEADE 2,621,482
PRESSURE-OPERATED MECHANISM FOR CONTROLLING FLUID FLOW
Filed Sept. 4, 1947 3 Sheets-Sheet 2

INVENTOR.
HAROLD W. MEADE,
BY
ATTORNEYS.

UNITED STATES PATENT OFFICE 2,621,482

PRESSURE-OPERATED MECHANISM FOR CONTROLLING FLUID FLOW

Harold W. Meade, Covington, Ind.

Application September 4, 1947, Serial No. 772,147

36 Claims. (Cl. 60—97)

This invention relates to fluid-pressure operated motor devices and to the control of internal-combustion engines by apparatus in which such devices are useful.

It is an object of the invention to produce an effectively regulable fluid-pressure motor device suitable for use in positioning a movable member, more particularly a movable control member, such as the throttle, choke-valve, or ignition timer of an internal-combustion engine. Another object of the invention is to produce a fluid-pressure, member-positioning motor which can be controlled manually or automatically with little effort, which can be controlled from a remote point without the necessity for extended mechanical connections, and which can readily be controlled solely in response to a single controlling factor or jointly in response to several.

A further object of the invention is to provide a device capable of use with an internal combustion engine to insure that the pressure of air or mixture supplied thereto will not exceed a predetermined maximum.

Still another object is to produce for use with the induction system of an internal combustion engine a control apparatus which will automatically co-ordinate the richness of the mixture with the load on the engine whereby to provide relatively lean and economical mixtures under constant speed, part-load conditions and relatively rich mixtures during periods of acceleration or under full-load conditions; which will compensate for changes in temperature and barometric pressure or in other conditions affecting engine operation; and which will function as a load-governor, as a speed governor, or as both.

A further object of the invention is to provide for a plurality of engines a common control capable of causing the engines to operate at substantially the same speed which can be varied by adjustment of the control.

In carrying out my invention I employ a pressure-responsive element arranged to be responsive to fluid pressure within a passage which communicates at spaced points with bodies of gaseous fluid having different pressures, and I control communication of such passage with one of the bodies of gaseous fluid by a valve which can be adjusted to vary the rate of flow through the passage and hence to vary the pressure to which the pressure-responsive element is subjected. Where control in response to a plurality of conditions is desired, there may be a plurality of independently adjustable communication-controlling valves. In the specific embodiments of my invention disclosed herein, the bodies of gaseous fluid are, respectively, the atmosphere and the gaseous fluid posterior to the throttle in an induction passage of an internal combustion engine, and the valve is associated with the opening through which the passage communicates with the atmosphere to control the rate of air-bleed into the passage; but other arrangements are possible. In any situation where the passage communicates at one end with the atmosphere through a valved air-bleed opening, the passage may extend to, and the valved opening be located at, any convenient control point; and the valve may be arranged either for manual control or for automatic control in response to any variable condition.

Fluid-pressure motors of the type just referred to, together with their associated controlling mechanisms, may be used in a wide variety of situations in control mechanism for the induction system of an internal combustion engine. For example, a pressure-responsive element may be operatively connected to a throttle to control the position of such throttle in response to any variable condition, including the position of a manually movable member, controlling an air-bleed valve. If desired, the device may be adapted to provide a servo action, so that response of the throttle to changes in the condition controlling the air-bleed valve will be terminated by movement of the throttle and without further change in the controlling condition.

In taking fullest advantage of my invention in the control of an internal combustion engine, the engine is provided with a branched induction conduit each branch of which is provided with an independently controlled, flow-regulating throttle. One branch of the conduit is used to supply auxiliary air, and the throttle in such branch is arranged to be controlled in response to the difference between posterior-throttle pressures in both branches. The supply of fuel to the engine is controlled in accordance with the rate of air-flow through the other branch, and the throttle therein is positioned by a fluid-pressure motor or pressure-responsive element of the type above referred to. The air-bleed valve which controls operation of such pressure-responsive element may be controlled in response to any desired condition. Additional air-bleed openings controlled by valves may be employed to modify the effect of pressures in either conduit-branch upon the throttle in the auxiliary-air branch. Any air-bleed passage may have one or more valves controlling flow through it to provide automatic induction-system control in response to a single controlling condition or in response to the joint effect of two or more controlling conditions.

This application is a continuation-in-part of my co-pending application Serial No. 438,770, filed April 13, 1942, now abandoned.

The accompanying drawings illustrate my invention.

Figure 1:
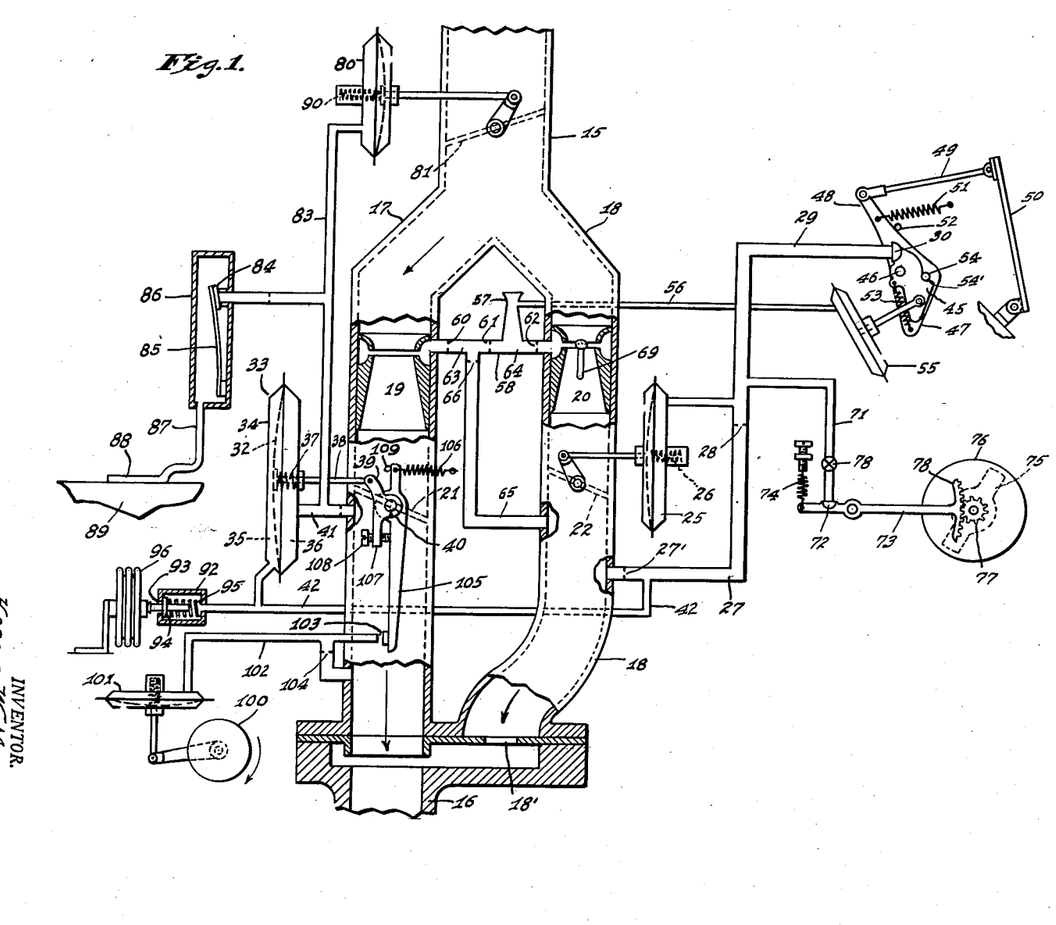
Fig. 1 is a diagrammatic illustration of a branched induction system for an internal-combustion engine provided with a plurality of control devices which modify mixture-proportions in accordance with speed, load, barometric and temperature conditions, which provide control of the rate of mixture supply in accordance with engine speed, which provide automatic choking or mixture-enrichment when the engine is being cranked, and which control ignition timing in a novel manner.

In Fig. 1 of the drawings I have indicated an inlet passage for an internal combustion engine, such passage comprising successive sections 15 and 16 interconnected by two parallel branches 17 and 18. Such branches are shown as respectively containing venturis 19 and 20 and flow-controlling valves or throttles 21 and 22; but the venturi 19 may be eliminated in certain instances. Partially to isolate the posterior-throttle regions of the two branches 17 and 18 one from the other, whereby to reduce the direct effect of pressure variations in one branch or pressure in the other branch, the branch 18 is shown in Fig. 1 as provided near its outlet end with a restricted orifice 18'.

The throttle 22 in branch 18 is operatively connected to a pressure-responsive element 25 which is loaded by a spring 26 biasing the throttle 22 toward closed position and which is adapted when subjected to sub-atmospheric pressure to move the throttle 22 toward open position. The pressure-responsive element 25 is connected by a passage 27 with a point in the branch 18 posterior to the throttle 22, preferably through an orifice 27'. Desirably, the conduit 27 includes a flow-restricting orifice 28. Between the pressure-responsive element 25 and the restriction 28, the conduit 27 communicates with a bleed passage 29 having an air inlet opening controlled by a valve 30. It will be apparent that with the valve 30 closed the pressure-responsive element 25 will be subjected to the subatmospheric pressure or partial vacuum existing in the passage branch 18 posterior to the throttle 22 when the engine is operating. Opening of the valve 30, however, by admitting air into the conduit 27 will cause an increase in the pressures along such conduit and a consequent increase in the pressure to which the element 25 is subjected, thus tending to close the throttle 22.

The throttle 21 is operatively connected to the diaphragm 32 of a pressure-responsive element 33 which includes, in addition to the diaphragm, a casing 34 divided by the diaphragm into two chambers 35 and 36. The diaphragm is shown as loaded by a spring 37 biasing it for throttle-closing movement. In the particular arrangement shown, the diaphragm 32 is connected through a link 38 with an arm 39 secured to the shaft 40 upon which the throttle 21 is mounted. The chamber 36 of the pressure-responsive element 33 communicates through a passage 41 with a point in the branch 17 posterior to the throttle 21, while the chamber 35 communicates through a passage 42 with a point in the branch 18 posterior to the throttle 22. Preferably, the connection of the passage 42 to the branch 18 is through the orifice 27' in passage 27. As a result, the position of the diaphragm 32 and of the throttle 21 will depend jointly upon pressures in the respective passage-branches 17 and 18 at points posterior to the respective throttles therein. An increase in posterior-throttle pressure in the branch 17 tends to close the throttle 21, while a decrease in such pressure tends to open the throttle 21. An increase in posterior-throttle pressure in the branch 18 will tend to open the throttle 21, while a decrease in such pressure will tend to close it.

The valve 30, which as above set forth modifies the throttle-opening effect on the element 25 of sub-atmospheric pressures in the conduit-branch 18, as adapted for joint automatic and manual control. In the particular arrangement illustrated in Fig. 1, the valve 30 is carried by a lever 45 which is freely rotatable on a shaft 46. The shaft 46 also carries a plate 47 and rigid with it an arm 48 operatively connected, as through a link 49, with an accelerator pedal 50. Conveniently, the plate 47 and arm 48 are rigidly mounted on the shaft 46 to rock as a unit therewith. A spring 51 acting on the arm 48 biases it and the plate 47 for clockwise swinging movement about the axis of the shaft 46, movement of the arm and plate under the influence of the spring being limited by an abutment 52 positioned to engage the arm. A spring or other yielding means 53 acting between the lever 45 and the plate 47 biases the former in a counter-clockwise direction or toward the position in which the valve 30 will be closed, the arrangement being such that upon depression of the accelerator pedal and the resultant counter-clockwise swinging of the plate 47 the force exerted by the spring 53 on the lever 45 will be increased. A pin 54 is positioned on the plate 47 to engage a shoulder 54' on the lever 45 when the plate is at the clockwise limit of its movement and positively hold the valve 30 open against the effort exerted on the lever 45 by the spring 53.

Means opposing the spring 53 and responsive to the speed of the engine is provided to move the lever 45 in a valve-opening direction as engine speed increases. In the specific arrangement illustrated, such means embodies a pressure-responsive element 55 operatively connected to the lever 45 and connected through a passage 56 with the throat of an aspirator 57 associated with a passage 58 which extends between the throat of the venturi 20 and a point in the branch 17 anterior to the throttle 21, such point being the throat of the venturi 19 when that venturi is employed. Three restrictive orifices 60, 61, and 62 located in spaced relation along the passage 58 divide it into two end sections and two intermediate sections 63 and 64. The aspirator 57, which receives air from the atmosphere or its equivalent, discharges into the passage-section 64, while the passage-section 63 is connected through a passage 65 with a point in the branch 18 posterior to the throttle 22. The passage 65 desirably contains a restrictive orifice 66. The passage-portions 64 and 63, together with the passage 65 consitute a by-pass around the throttle 22. Such a by-pass associated with an aspirator constituting an element of throttle-controlling mechanism is broadly disclosed in my prior Patent No. 2,326,791, issued August 17, 1943.

When the engine which is supplied with air through the inlet passage 15—16 is idling with the throttle 22 closed, the pressure drop at the throat of the venturi 20 may be relatively low, but a relatively high vacuum will exist in the passage-branch 18 beyond the throttle 22. Under such conditions, air will be drawn through the aspirator 57 and discharged through passage 64, orifice 61, and passage 65 to the branch 18 beyond the throttle therein. Because of the relatively high pressures existing at the throats of the venturis 19 and 20, the orifices 60 and 62 will act as air-bleed openings increasing pressure in the passage-section 64 and hence reducing flow through the aspirator 57. If the throttle 22 is opened to produce an increase in the rate of flow through the passage-branch 18, the pressure posterior to the throttle 22 will increase, while the pressure at the throat of the venturi 20 will decrease. The pressure increase tends to reduce the rate of flow through the aspirator 57, but the pressure-reduction at the throat of the venturi 20 has the opposite effect. At fully open throttle, or under full load conditions the pressures at the throats of the venturis will be lower than that in the branch 18 posterior to the throttle 22, flow through the aspirator 57 will be primarily due to reduced pressures at the Venturi-throats, and air passing upwardly through the passage 65 past the orifice 66 will act as a bleed to increase pressure in the passage 64 and thus tend to decrease the rate of flow through the aspirator 57. By proper proportioning of the restrictions 60, 61, 62, and 66 it is possible to so adjust the apparatus that the static pressure at the throat of the aspirator 57 will be primarily a function of engine speed and largely independent of load or throttle position, the pressure in the aspirator throat decreasing as engine speed increases.

My invention as exemplified in Fig. 1 contemplates that fuel will be supplied to air flowing through the conduit 15—16 in response to the partial vacuum existing in the branch 18 anterior to the throttle 22 therein and preferably in response to the partial vacuum existing at the throat of the venturi 20. As shown, a fuel-jet 69 is located at the latter point so that its rate of discharge will vary in the same sense as does the rate of air-flow through the branch 18. It is to be understood, however, that any other form of fuel-supply means may be used so long as its rate of discharge is proportioned to the rate of air-flow through the branch 18.

The apparatus as so far described operates as follows: Assuming that the accelerator pedal 50 is fully elevated with the arm 48 and plate 47 at the clockwise limit of their movement as determined by the abutment 52, the pin 54 on the plate 47 will be engaged with the shoulder 54' on the lever 45 to hold the valve 30 open. With the associated engine operating under these conditions, although a high vacuum exists in the passage branch 18 posterior to the throttle 22, sufficient air will enter the open end of the passage 29 to increase pressures in the passage 27 to a point such that the spring 26 may hold the throttle 22 closed. The engine will of course be running at idling speed. If it is desired to increase the speed of the engine, the accelerator pedal is depressed to rock the arm 48 and plate 47 in a counterclockwise direction, thus moving the pin 54 out of engagement with the shoulder 54' and permitting the spring 53 to swing the lever 45 in a counterclockwise direction and close the valve 30. With the valve 30 closed, the pressure all along the passage 27 drops substantially to that in the branch 18 posterior to the throttle 22. Such reduced pressure, transmitted to the pressure-responsive element 25, causes it to operate in opposition to the spring 26 to move the throttle 22 toward open position, thus causing an increase in engine speed. As the engine speed increases, the rate of air flow through the aspirator 57 increases and the pressure at the aspirator throat decreases. Such pressure-decrease, transmitted to the pressure-responsive element 55 through the passage 56, tends to swing the lever 45 in a clockwise direction to open the valve 30. Movement of the lever 45 under the influence of the pressure-responsive element 55 is opposed by the spring 53, the extent of such opposition depending upon the extent to which the accelerator pedal 50 was depressed. As long as the effect of the spring 53 predominates over that of the pressure-responsive element 55, the valve 30 remains closed, the throttle 22 continues to move toward open position, the speed of the engine continues to increase, and the pressure at the throat of the aspirator 57 continues to decrease. Eventually, the pressure at the throat of the aspirator 57 will be reduced to such an extent that the pressure-responsive element 55 will predominate over the spring 53 and will rock the plate 45 in a clockwise direction to open the valve 30. When this occurs, the air bled through the passage 29 increases pressures along the passage 27 until the spring 26 associated with the pressure-responsive element 25 is able to overcome the throttle-opening tendency of such element. When this occurs, throttle-opening ceases.

Should the accelerator pedal 50 be further depressed, the resultant increase in the tension of spring 53 would rock the lever 45 in a clockwise direction, close valve 30, reduce pressures along the conduit 27, and permit the pressure-responsive element 25 to open the throttle 22 further. The progressive increase in engine speed resulting from opening of the throttle 22 would cause a further reduction in pressure at the throat of the aspirator 57 and eventually enable the pressure-responsive element 55 to swing the lever 45 and reopen valve 30.

Upon elevation of the accelerator pedal 50 from a depressed position, the arm 48 and plate 47 swing in a clockwise direction, thus relieving tension in the spring 53 with the result that the vacuum existing in the pressure-responsive element 55 is enabled to swing the plate 45 in a clockwise direction and move the valve 30 toward open position. This causes an increase in the air bleed to the passage 27, an increase in the pressures along such passage, and a decrease in the throttle-opening effort exerted by the pressure-responsive element 25, with the result that the spring 26 causes the throttle 22 to move toward closed position. The ensuing reduction in engine speed will be accompanied by an increase in the pressure at the throat of the aspirator 57 and a consequent lessening of the tendency of the pressure-responsive element 55 to move the plate 45 in the direction to open the valve 30. Throttle-closing movement will continue until the pressure at the throat of the aspirator 57 has reached such a value that the valve-opening effort of the pressure-responsive element 55 will be in equilibrium with the valve-closing effort of the spring 53.

The pressure-responsive element 33 associated with the throttle 21 causes such throttle to follow generally the movements of the throttle 22. Since the chamber 35 on one side of the diaphragm 32 is connected through passage 42 with the branch 18 at a point posterior to the throttle therein, while the chamber 36 on the opposite side of the diaphragm 32 is connected through passage 41 to a point in the branch 17 posterior to the throttle 21, the pressure-responsive element 33 will act on the throttle 21 to co-ordinate the posterior-throttle pressure in the branch 17 with that in the branch 18; and in co-ordinating pressures in the two branches the element 33 will function to co-ordinate velocities. Actually, in the specific arrangement shown in Fig. 1, the pressure in the chamber 35 of element 33 will equal posterior-throttle pressure in the branch 18 only during periods of acceleration when the valve 30 is closed; for, when such valve is open flow will exist in passage 27, there will be pressure-drop across orifice 27', and the pressure in the chamber 35 will be higher than that in the branch 18. If both sides of the diaphragm 32 are of equal effective area the excess pressure in chamber 35 would tend to open the throttle 21. The spring 37 is proportioned to balance that tendency under idling conditions so that the throttle 21 will then be closed. If the valve 30 is now closed, the throttle 22 will open as above set forth, creating a rise in posterior-throttle pressure in the branch 18; and such pressure-rise, transmitted to the chamber 35, will tend to cause opening of the throttle 21. The closing of valve 30 which initiated opening of throttle 22 terminates flow through the passage 27 and eliminate the pressure-drop across the orifice 27', thus tending to decrease the pressure in the chamber 35; but the orifice 27' is made large enough that the elimination of the pressure-drop across it will be more than offset by the increase in pressure in the branch 18 caused by opening of the throttle 22, and opening of the throttle 22 will therefore be immediately followed by opening of the throttle 21. As the throttle 21 opens, the pressure in the branch 17 posterior to it increases the pressure in the chamber 36 offsetting the pressure-increase in the chamber 35. Upon closing of the throttle 22, pressure in the chamber 35 drops and causes the throttle 21 to close until a new equilibrium condition is established.

As will be obvious, the proportions of the mixture delivered to the engine will depend to a large extent upon the relative rates of flow through the passage-branches 17 and 18. Any opening of the throttle 22 unaccompanied by an opening of the throttle 21 would cause an increase in the richness of the mixture supplied to the motor while a closing of the throttle 22 unaccompanied by closing of the throttle 21 would reduce the richness of the mixture. In addition, the richness of the mixture will also be modified by air bled through the passage 27 from the open inlet end of the passage 29.

It is to be noted that while the pressure-responsive element 33 causes the throttle 21 to move generally with the throttle 22, changes in the rate of air-bleed, which produce movement of the throttle 22, cause the throttle 21 to lag in following the throttle 22. This results from the fact that air bled into the branch 18 through passage 29—27, by tending to increase pressure in the branch 18, produces an incremental throttle-opening effect on the pressure-responsive element 33. That incremental throttle-opening effect is augmented by the pressure-drop at the orifice 27', and obviously varies in the same sense as does the rate of air-bleed through the passage 29—27. When the pedal 50 is depressed to close the valve 30, the bleeding of air ceases and its incremental throttle-opening effect on the element 33 becomes non-existent, but the throttle 22 moves toward open position as set forth above. As the engine responds to opening of the throttle 22, the throttle 21 follows in the manner previously described; but, because no air is being bled through the passage 29—27 to exercise the incremental throttle-opening effect on element 33, the throttle 21 opens more slowly than it otherwise would. As the valve 30 begins to open under the influence of reduced pressure at the throat of aspirator 57, the bleeding of air is resumed and its incremental throttle-opening effect accelerates opening of the throttle 21.

The elimination during periods of engine acceleration of both the air bleed itself and its incremental effect on the position of the throttle 21 results in providing a mixture of increased richness. It is usually deemed desirable that a carburetor provide a mixture of increased richness during periods of acceleration. The decrease in mixture richness which is produced as air-bleeding resumes promotes economy of operation.

The precise effect upon mixture proportions of changes in the rate of air bled through the passages 29 and 27 will obviously depend upon several factors such as the characteristics of the springs 26 and 37, the size of the orifice 27', and the relative size of the branches 17 and 18. It is possible, if desired, to so proportion the parts that the reduction in the richness of the mixture which characterizes the terminal portions of an acceleration period plays an important part in causing the eventual termination of that acceleration period. That is, any acceleration period terminates when the fuel passed by the throttle supplies just enough energy to overcome the load on the engine. If, as is the case in the apparatus described, the richness of the mixture is reduced as the acceleration period nears its end, the acceleration period will terminate earlier and at a lower engine speed than if the mixture proportions remained constant. By suitable proportioning of the parts, the change in mixture proportions can be made a very material factor in terminating acceleration. In fact, the device can be so constructed that under equilibrium conditions at closed or part throttle the mixture is just barely rich enough to maintain the engine in operation. Should the load on the engine increase to cause a reduction in engine-speed, the resultant increase in pressure at the throat of the aspirator 57 would cause the pressure-responsive element 55 to move the valve 30 toward closed position, thus decreasing the rate of air-bleeding, producing an increase in the richness of the mixture, and causing both throttles to move toward open position. In this respect, the device acts in the manner of a load governor, tending to maintain the engine at a constant speed for any given position of the pedal 50.

The apparatus of Fig. 1, and especially the pressure-responsive element 25, and its associated controlling elements, may be employed to insure the existence of a minimum vacuum in the branch 18 posterior to the throttle 22. This result can be accomplished by employing a spring 26 of such stiffness that the minimum vacuum, even when the valve 30 is completely closed, is insufficient to open the throttle fully. Such an arrangement can be employed with advantage in conjunction with vacuum-operated devices, such as wind-shield wipers, which require the existence of a minimum vacuum for satisfactory operation or in conjunction with high-compression engines to prevent excessive compression pressures under high-load, low-speed conditions.

Any vacuum-operated motor in accordance with my invention may have more than one controlling air-bleed opening so that its operation may be controlled by a plurality of controlling factors or conditions. In Fig. 1 I have illustrated the pressure-responsive element 25 as being provided with a second air-bleed opening which is controlled in accordance with vehicle speed to effect a governing action. To accomplish this result, the bleed passage 29 is provided with an auxiliary passage 71 the inlet of which is controlled by a valve 72 mounted on a pivoted lever 73 which is biased in the valve-closing direction by a spring 74. Means for opening the valve 72 in opposition to the influence of the spring 74 comprises a rotatably mounted permanent magnet 75 which is adapted to rotate at a speed proportional to that of the vehicle and with which there is associated a co-axial disk 76 of non-magnetic metal. A pinion 77 rigid with the disk 76 meshes with a sector 78 on the end of the lever 73. As the magnet 75 rotates, the disk 76 tends to follow it, the magnitude of such tendency varying with the speed of magnet rotation. When the tendency of the disk 76 to rotate overcomes the force exerted on the lever 73 by the spring 74, the lever moves to open the valve 72, thus admitting air through the passage 71, reducing the vacuum in the pressure-responsive element 25, and causing the throttle 22 to move toward closed position. As will be obvious, such a control provides for a maximum vehicle speed the value of which can be varied by adjustment of the spring 74. A valve 76 in the passage 71 may be employed to render the speed-responsive control inoperative.

Vacuum-operated motors associated with controlled air-bleeds may be employed for operating elements other than a throttle. Thus, I have shown in Fig. 1 a pressure-responsive element 80 which is operatively connected with a choke valve 81 in the passage-section 15. The pressure-responsive element 80 is connected through a passage 83 with the passage 41 between the branch 17 and the compartment 36 of the pressure-responsive element 33, and the passage 83 is provided with an air-bleed opening controlled by a valve 84. The valve 84 is mounted on the free end of a bi-metallic strip 85 arranged to open the valve 84 on a reduction in the temperature to which the strip 85 is subjected. In the particular arrangement shown, the valve 84 and bi-metallic strip 85 are located in a casing 86 the interior of which communicates, under the control of the valve 84, with the passage 83 and also with a conduit 87 having an inlet portion 88 disposed adjacent some convenient portion of the engine.

The pressure-responsive element 80 includes a spring 90 which biases the choke valve 81 toward closed position and is arranged to open the choke valve 81 in response to partial vacuum in the branch 17 posterior to the throttle 21. Under low temperature conditions, the bi-metallic strip 85 will hold the valve 84 open with the result that the low vacuum existing in the branch 17 posterior to the throttle 21 while the engine is being cranked will be insufficient to overcome the effect of the spring 90 and open the choke valve 81. However, when the engine begins to operate, the vacuum posterior to the throttle 21 increases and causes the element 80 to move the choke valve 81 toward open position. Air bled past the valve 84 tends to reduce the extent of choke valve opening. Such air, passing from the conduit 88—87 through the casing 86 and over the bi-metallic strip 85 increases in temperature as the engine 89 becomes heated, causing the bi-metallic strip 85 eventually to close the valve 84. When this occurs, air-bleed through the passage 83 terminates, and its tendency to reduce the extent of choke-valve opening disappears.

By taking advantage of the tendency of air bled past the valve 84 to decrease the extent of choke-valve opening, it would be possible to employ the choke valve not only to provide an enriched mixture during cranking but also, although to a gradually diminishing extent, to provide extra mixture-richness during the warm-up period following starting of the engine. I prefer, however, to employ the choke valve principally to provide increased richness during cranking and to rely on other features of my device to control mixture-proportions during the warm-up period. It is for this reason that the air-bled passage 83 is shown in Fig. 1 as communicating with the passage 41 rather than directly with the branch 17. The effect of the choke valve 81 in influencing mixture-proportions when the engine is operating can be reduced or substantially eliminated by proportioning the spring 90 so that the choke valve will be fully, or approximately fully, opened under the pressure conditions existing in the branch 17 whenever the engine is operating under its own power.

With the passage 83 communicating with the passage 41, air bled past the valve 84 enters the passage 41 and affects pressure in the compartment 36. Specifically, such air acts to increase the pressure in compartment 36, causing the throttle 21 to move toward closed position. Irrespective of whether or not the passage 83 continues on to the pressure-responsive element 80, the temperature-responsive valve 84 acts to control mixture proportions by controlling the relative positions of the throttles 21 and 22. As previously noted, under low-temperature conditions the valve 84 is open and the resultant air-bleed, by increasing pressure in the passage 41 and compartment 36 reduces the response of the throttle 21 to opening movement of the throttle 22. As the temperature increases, however, the valve 84 moves toward closed position, reduces the amount of air-bleed, reduces pressures in the passages 41 and 36, and hence causes the throttle 21 to move toward open position to increase the amount of air supplied to the combustible mixture leaving the device through the conduit-section 16. In this manner an originally rich mixture may be rendered progressively leaner as the engine warms up following a cold start.

Control of mixture proportions in accordance with barometric conditions may easily be accomplished in the device shown in Fig. 1. As there indicated, the passage 42, which connects the chamber 35 with the passage-branch 18, is connected at an intermediate point to a casing 92 which has an air-bleed opening 93. Associated with the opening 93 is a valve 94 normally held closed by a spring 95. A barometric element, shown as a bellows 96, is associated with the valve 94 to open it upon a drop in barometric pressure. When the valve 94 is opened by the bellows 96, the air bled into the passage 42 through the opening 94 increases pressure in the chamber 35 and causes the throttle 21 to move toward open position to compensate for the reduced density of the air.

An air-bled vacuum-operated motor in accordance with my invention can be used with advantage in the control of ignition timing. In Fig. 1, I have shown a timer 100 operatively connected to a vacuum-responsive timer control of any appropriate type shown as including a pressure-responsive element 101 which communicates through a passage 102 with the branch 18 at a point posterior to the throttle therein. The passage 102 is provided with an air-bleed opening controlled by a valve 103 and also with a restricted orifice 104 disposed between the air-bleed opening and the point at which the passage 102 communicates with the branch 17. The valve 103 is mounted on one end of an arm 105 which may conveniently be rotatively mounted on the shaft 40 of the throttle 21 and which is biased in a valve-closing direction as by means of a spring 106. The arm 105 is so associated with the throttle 21 that the valve 103 will be opened when the throttle 21 moves to its extreme closed position. To this end, the throttle-operating arm 39 may be provided with an extension 107 carrying an adjusting screw 108 which bears on the arm 105.

In the construction described, at any time when the throttle 21 is partly or fully open, the valve 103 is closed, and the pressure-responsive element 101 is responsive to pressures in the branch 17 posterior to the throttle 21. However, when the throttle 21 is moved to fully closed position the adjusting screw 108 engages the arm 105 and moves it to open the valve 103. The resultant air-bleed to the passage 102 reduces the vacuum to which the pressure-responsive element 101 is subject. Closing of the throttle 21 is limited by an abutment 109.

In controlling ignition timing, the timer, which may be on any suitable form of vacuum-controlled timer, operates in the known manner of such devices whenever the valve 103 is closed— i. e., except when the throttle 21 is in or immediately adjacent closed position. However, when the throttle is completely or substantially completely closed, the valve 103 is open, the timer-advancing effect of vacuum in the passage 18 is reduced, and ignition timing is retarded. Should the engine be used as a brake in descending a hill, the tendency of the engine to run at greater than idling speed will increase vacuum at the throat of the aspirator 57 and in the passage 56, thus causing the pressure-responsive element to open the valve 30. The resultant increase in air-bleed to the branch 18 will cause an increase in pressure therein, and such pressure-increase will in turn cause the pressure-responsive element 34 to open the throttle 21, close the valve 103, and advance the spark.

Figure 2:
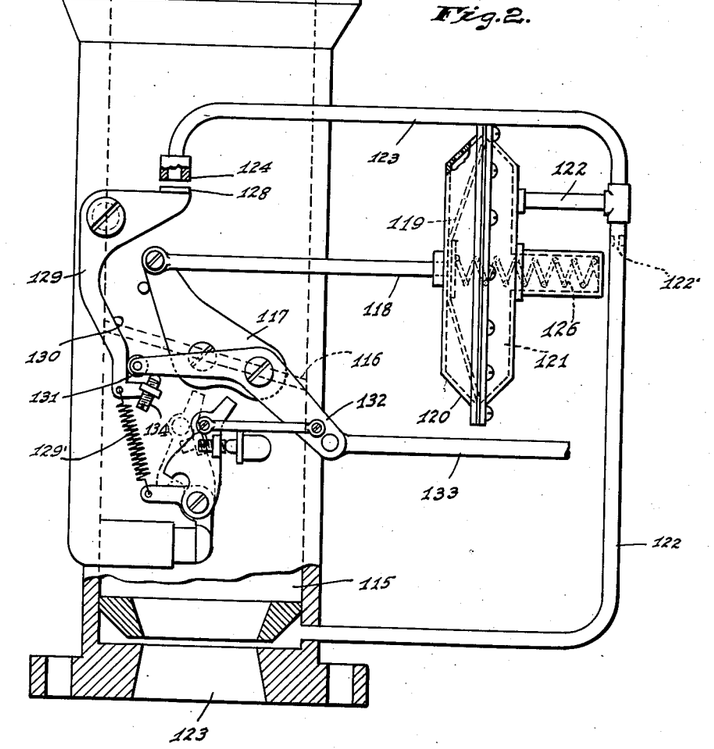
Fig. 2 is an elevation, in partial section, of a simple form of throttle-controlling mechanism responsive to manual regulation.

The carburetor illustrated in Fig. 2 is equipped with the throttle-controlling mechanism set forth and described in my prior application Serial No. 438,770, now abandoned. Fig. 2 shows the carburetor as having a single, down-draft inlet passage 115 flow through which is controlled by a throttle 116. Rigid with the throttle is an arm 117 operatively connected as by a link 118 with the diaphragm 119 of a pressure-responsive element 120. The diaphragm 119 defines one side of a chamber 121 which communicates through a conduit 122 with a point in the inlet passage 115 posterior to the throttle therein. If desired, the passage 115 may include a venturi or aspirator 123 located posterior to the throttle and with the throat of which the conduit 122 communicates. Between its point of communication with the passage 115 and the chamber 121, the passage 122 is provided with a flow-restricting orifice 122'; and between such orifice and the chamber 121, the conduit 122 communicates with a second conduit 123 terminating in an air-bleed opening 124.

The parts are so arranged, as indicated in the drawing, that sub-atmospheric pressure in the chamber 121 will tend to move the throttle 116 toward open position. The pressure-responsive element 120 includes a yielding means, such as a spring 126, which opposes throttle-opening movement of the diaphragm 119.

The air-bleed opening 124 is controlled by a valve 128 mounted on one arm of a bell-crank 129 the second arm of which is provided with a cam surface 130. The cam surface 130 engages a roller 131 mounted at one end of a lever 132 which is pivotally mounted at an eccentric point on the lever 117. The lever 132 is adapted for manual adjustment about its point of pivotal mounting on the lever 117, as by being connected to a control rod 133 extending to an operator's station. Outward movement of the roller 131 along the cam surface 130 may be limited as by means of a limit-screw 134 which is adjustably mounted in the bell-crank 129 in position to be engaged by the lever 132. A spring 129' or other appropriate yielding means urges the bell-crank 129 in valve-closing direction to the limit permitted by engagement of the cam surface 130 with the roller 131.

The throttle-controlling mechanism just described operates in somewhat the same fashion as does the mechanism which is employed in Fig. 1 to control the throttle 22 thereof. The air-bleed valve 128 is controlled jointly by the position of the throttle and by the mechanical setting of the control rod 133. When the valve 128 is closed, the sub-atmospheric pressure which exists in the passage 115 posterior to the throttle 116 when the engine is operating is transmitted, unmodified, to the chamber 121 and tends to open the throttle 116 in opposition to the spring 126. As the throttle opens, the point of pivotal connection between the levers 117 and 132 moves downwardly to cause the roller 131 to move outwardly along the cam surface 130, thus opening the valve 128. When the valve 128 opens, the resultant admission of air to the passage 122 tends to increase the pressure in the chamber 121 and reduce the throttle-opening effect to that of equilibrium.

The parts are shown in Fig. 2 in the positions existing when the throttle 116 is closed. When the associated engine is operating at closed throttle, a relatively high vacuum exists in the passage 115 posterior to the throttle. However, the valve 128 is open to cause air to be bled into the passage 122 with the result that the effective vacuum in the chamber 121 is insufficient to overcome the throttle-closing effect of the spring 126, and the throttle is therefore closed. When it is desired to open the throttle, the control rod 133 is moved to the left, thus swinging the lever 132 in a clockwise direction about its axis of pivotal mounting on the lever 117. As the roller 131 moves upwardly along the cam surface 130, the spring 129' causes the bell-crank 129 to swing and close the valve 128. With the resultant termination of the air bled to the passage 122, the chamber 121 becomes subject to the full vacuum existing in the passage 115 posterior to the throttle 116, and the diaphragm 119 moves to the right to open the throttle 116. As the throttle opens, the point of pivotal connection between the levers 117 and 132 moves downwardly, the roller 131 descends along the cam surface 130, and the valve 128 begins to open. Eventually, a condition of equilibrium will be reached in which the sub-atmospheric pressure in the chamber 121 will be balanced by the spring 126, and the throttle will come to rest.

The device of Fig. 2 possesses the same advantage of that of Fig. 1 in respect to insuring a minimum intake-manifold vacuum and preventing unduly high compression pressures under low-speed, heavy-load conditions. If the spring 126 is made stiff enough to prevent the throttle from being fully opened by the unmodified inlet passage pressure which would exist posterior to the throttle if the latter were fully open and the engine operating at low speed, it will be obvious that full opening of the throttle at low engine speed cannot be accomplished. In other words, even if the lever 132 is swung to its limit in a clockwise direction, the throttle-opening which occurs as a result of closing the air-bleed valve 128 can proceed at the most only to the point at which the effect of inlet passage pressure in the chamber 121 is balanced by the throttle-closing effect of the spring 126. At open throttle and low engine speed, intake-passage vacuum will be insufficient to result in complete opening of the throttle. However, as the engine speed increases as the result of the initial throttle opening movement, the vacuum in the intake-passage 115 will increase, will be transmitted to the chamber 121 and will cause a further increase in the opening movement of the throttle.

Figure 3:
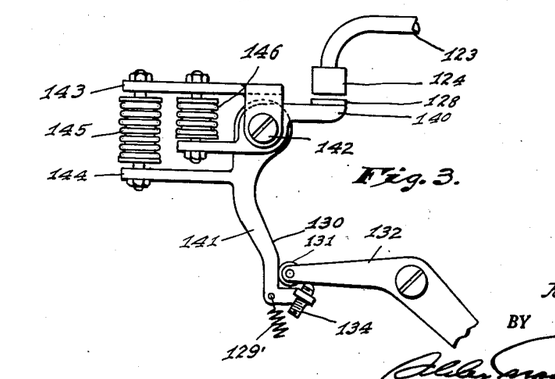
Fig. 3 is a fragmental illustration showing a modification of the structure of Fig. 2.

In Fig. 3 I have illustrated a modification of the device shown in Fig. 2, which modification provides accommodation for changes in barometric pressure and in temperature. In the arrangement of Fig. 3, the valve 128 and cam surface 130, instead of being arranged on a single rigid member, are arranged on independently movable levers 140 and 141, respectively. As shown, the levers 140 and 141 are mounted for independent pivotal movement on a pivot screw 142 which also pivotally supports a third, or intermediate, independently movable lever 143. The lever 141 is provided with a lateral projection 144 between which and the lever 143 there acts a temperature-responsive bellows element 145. The levers 140 and 143 are interconnected by a barometric element 146, conveniently also a bellows. The arrangement of the parts is such that with the lever 141 in fixed position the valve 128 will be moved toward closed position by either a drop in atmospheric pressure acting on the bellows 146 or by a decrease in temperature acting on the bellows 145.

Except for the modification of its operation provided by the bellows 145 and 146, the device of Fig. 3 operates substantially like that of Fig. 2. That is, the spring 129' acts on the lever 141 to hold the cam surface 130 in contact with the roller 131 on the manually positioned lever 132. For any given position of the roller 131, the position of the valve 128, and hence the extent of air-bleeding into the passage 123, will depend upon barometric and temperature conditions. Upon a drop in barometric pressure, the lever 140 will be swung in a counter-clockwise direction relative to the lever 141, thus moving the valve 128 toward closed position. As a result of the decrease in the amount of air bled into the passages 123 and 122, the pressure in the chamber 121 will decrease and the throttle will be moved toward open position. Similarly, a decrease in temperature, by effecting the temperature-responsive bellows 145, will swing the levers 140 and 143 in a counter-clockwise direction relative to the lever 141 and likewise result in partial throttle-opening. Should the barometric pressure increase or the temperature increase the valve 128 would be moved toward open position, air-bleeding into the passages 123—122 would be increased, the vacuum in the chamber 121 would be decreased, and the throttle would be moved toward closed position.

Barometric and thermostatic control of the bleed-valve 128 may be employed whenever it is desired to correct for the direct effect of variations in the pressure and temperature of air being supplied to the engine, particularly those engines of such compression ratios that unrestricted opening of the throttle will produce excessive values of compression. In controlling the maximum intake pressure supplied to an engine, particularly aircraft engines, it has often been the practice for the throttle to be opened only to a fractional extent by the manual control mechanism, full throttle opening being obtained only when permitted by automatic devices of either a thermostatic or barometric nature, or both, employed to supplement the manual control. With the arrangement shown in Fig. 2, the limits of permissible opening are not variable in accordance with either barometric pressure or the temperature of the atmosphere. With the device of Fig. 3, however, the same barometric change which, acting directly on the element 119, tends to reduce throttle-opening, moves the valve 128 toward closed position, reduces air-bleed to the passage 123, tends to increase throttle-opening, and thus counteracts the direct effect of the barometric change on the element 119. The temperature-responsive element 145, by moving the valve 128 toward closed position relative to the arm 141 when the temperature drops and toward open position when the temperature rises provides a greater throttle-opening at low temperatures than at high temperatures.

Figures 4, 6:
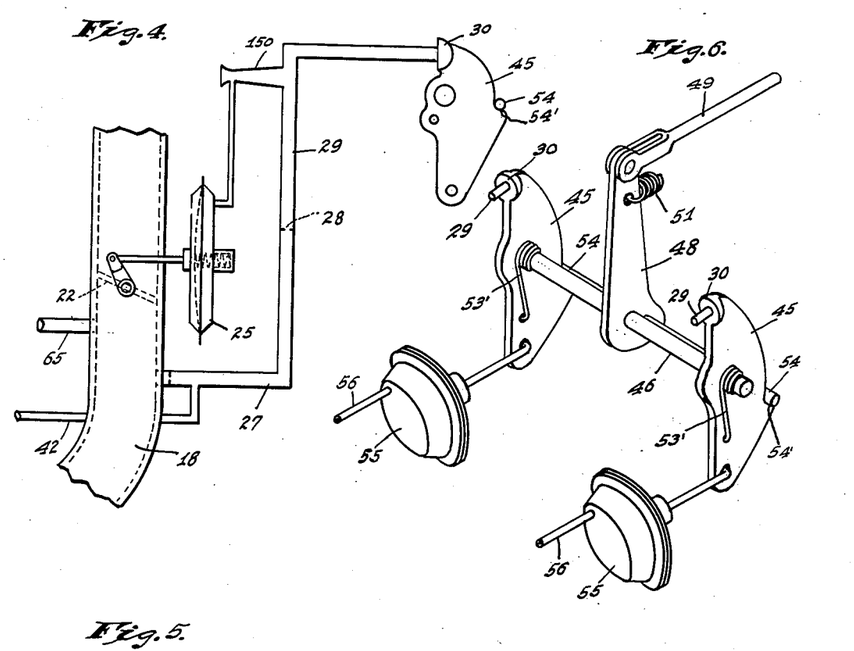
Fig. 4 is a fragmental diagrammatic view illustrating a modification of the system shown in Fig. 1.
Fig. 6 is an isometric view illustrating an arrangement of a portion of a control mechanism adapted to provide a common speed control for a plurality of engines.

Fig. 4 illustrates a modification of the apparatus illustrated in Fig. 1. Here, the pressure-responsive element 25, instead of being directly connected to the passage 27—29 is connected to the throat of an aspirator 150 which receives air from the atmosphere, or from some other source at substantially the same pressure, and which discharges into the passage 27—29 between the restriction 28 and the valved inlet thereof. The aspirator 150 serves to increase the effect on the pressure-responsive element 25 of pressure variations in the inlet conduit 18 posterior to the throttle 22, but otherwise the device works in the same manner as does that of Fig. 1.

Figure 5:
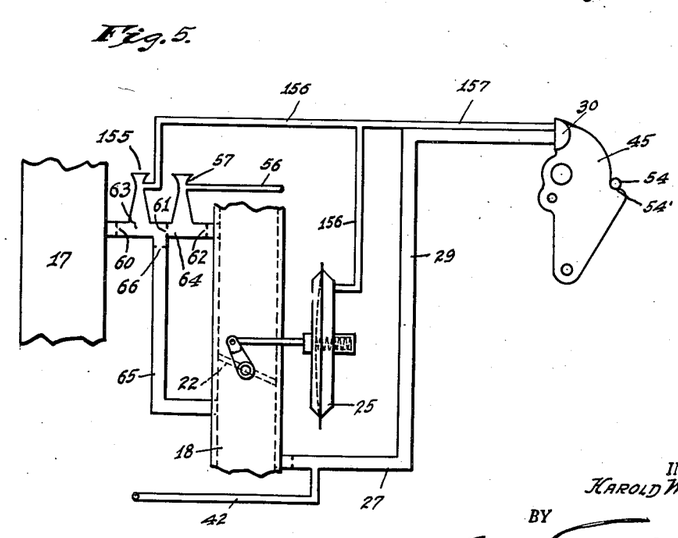
Fig. 5 is a fragmental diagrammatic view illustrating a further modification of the structure shown in Fig. 1.

Still another modification of the arrangement shown in Fig. 1 is illustrated in Fig. 5. In this modification, I provide an aspirator 155 which receives air from the atmosphere, or from some other source at substantially the same pressure, and which discharges into the space 63 in the conduit interconnecting the inlet branches 17 and 18. The pressure-responsive element 25, instead of communicating with the passage 27—29, communicates through a passage 156 with the throat of the aspirator 155, and the passage 156 is provided with an air-admitting branch 157 the inlet of which is controlled by the valve 30. The device of Fig. 5 operates much like that of Fig. 4, but the throttle-control it provides is more sensitive to speed changes, and the independence of the passages 157 and 29 provides a measure of independence in the control of the pressure-responsive element 25 on the one hand and, on the other hand, control of the pressure-responsive element 33 and of the extent of mixture dilution resulting from air flow through the passage 29—27.

Fig. 6 illustrates an arrangement whereby a structure such as that shown in Fig. 1 may be adapted to provide a common speed control for a plurality of engines. In this ararngement, as in that of Fig. 1, the manually adjustable control element 48 is rigidly mounted on the rockshaft 46. Whereas Fig. 1 contemplates the provision of a single lever 45, Fig. 6 contemplates that the control apparatus will include a lever 45 for each engine that is to be controlled. Each lever 45 carries a valve 30 co-operating with the inlet opening of an air-bleed passage 29, and each lever 45 is operatively connected to a pressure-responsive element 55. Each of the levers 45 is biased in a valve-closing direction by a spring 53' acting between it and the shaft 46. To insure opening of each valve 30 when the control arm 48 is at the rearward or clockwise limit of its movement any appropriate means may be employed. As shown in Fig. 6, the pin 54 is merely extended in both directions to co-operate with the shoulders 54' on all the levers 45.

When the apparatus shown in Fig. 6 is used to control a plurality of engines, each of such engines will be provided with its own inlet passage, in each inlet passage there will be a throttle, and each such throttle will be operatively connected to a pressure-responsive element 25 (Fig. 1) responsive to pressures in the associated air-bleed passage 29. With the inlet passage of each engine there will be associated an aspirator 57 (Fig. 1) or equivalent element the throat of which will be connected through a conduit 56 to a pressure-responsive element 55.

When the engines subjected to the common control are idling, the arm 48 will be at the rearward limit of its movement, and the pin 54 will engage the shoulders 54' to hold the valves 30 open. As the result of the air bled into the passages 29, the pressures in the respectively associated pressure-responsive elements 25 will be relatively high and the throttles will all be closed. When the control arm 48 is moved forwardly the valve-closing effects of the several springs 53' will be increased, and all the valves 30 will move to or toward closed position. The consequent reduction in air bleeding will decrease pressures in the several pressure-responsive elements 25 and will cause them to move their respectively associated throttles toward open position. As the speed of each engine increases, the pressure in its associated conduit 56 will decrease to increase the valve-opening effort exerted by the associated pressure-responsive element 55; and eventually, for each engine, a condition of equilibrium will exist in which the valve-opening effort exerted by each pressure-responsive element 55 will balance the valve-closing effort exerted by each spring 53' and the throttles of the several engines will all come to rest. If the engines are subjected to different loads, the rates at which they respond to initial opening of the throttles will vary, the heavier loaded engine or engines accelerating less rapidly than do the engines more lightly loaded. As the pressures to which the pressure-responsive elements 55 are respectively subjected vary with engine-speed, the pressure-responsive elements 55 associated with the more heavily loaded engines will lag in overcoming the valve-closing effort of the springs 53'; but each engine will continue to accelerate until the vacuum in its associated pressure-responsive element 55 balances the effort exerted on the plate 45 by the spring 53'. As a result, a plurality of engines may be caused to operate at substantially equal speeds even though subjected to varying loads; for the control means will automatically provide a greater throttle opening in the inlet passages associated with the more heavily loaded engines.

It is to be noted that control mechanism embodying my invention can be arranged to provide a servo action. That is, termination of the movement of a controlled member may be obtained, either directly or indirectly, by movement of the controlled member itself and without re-adjustment of the controlling member. In the device of Fig. 2, termination of throttle-movement is obtained directly as a result of that movement and without any re-adjustment of the control member 133. For example, as the control member 133 is moved to the left to close the valve 128, decrease the pressure to which the pressure-responsive element is subjected, and thereby cause opening movement of the throttle, rotation of the lever 117 rigid with the throttle will move the lever 132 to open the valve 128, raise the pressure in the pressure-responsive element, and cause throttle-opening to terminate. In the device of Fig. 1, termination of throttle-movement is secured as an indirect result thereof. Any change in the position of the control member 48 changes the position of the valve 30, alters the pressure to which the pressure-responsive element 25 is subjected, and thereby causes the throttle to move. As the engine responds to movement of the throttle, the vacuum at the throat of the aspirator 57 increases and causes the pressure-responsive element 55 to re-adjust the valve 30 and thus terminate movement of the throttle. In either device, the control member (48 in Fig. 1 or 133 in Fig. 2) may be regarded as serving to determine the point in throttle-movement at which such throttle-movement will be terminated.

Devices or apparatus including pressure-operated motors controlled in accordance with my invention are highly flexible in respect to their possible uses and installations. They can, for example, be employed to position a wide variety of movable members. The passage through which the pressure-responsive element communicates with atmosphere can extend to, and the valve controlling such communication can be located at, any convenient control point, thus making it possible in many instances to eliminate mechanical connections extending over relatively large distances from a control point to the mechanism controlled.

My device permits the control of relatively large forces by relatively small forces. Thus, the effort required to control an air-bleed valve such as the valves 30 and 84 of Fig. 1 or the valve 128 of Fig. 2, bears no necessary relation to the force exerted by the pressure-responsive element controlled by any such valve. Further, relatively small movement of an air-bleed valve can be employed to produce much greater movement of a movable member operated by the associated pressure-responsive element. In the device of Fig. 1, changes in the rate of air flow to the passage 27 so small as to be without any direct effect on engine operation can, by their effect on the pressure-responsive element 34, be availed of to produce much greater changes in the rate of air supply.

Reference has been made above to the advantage of the structure shown in Fig. 1 in respect to fuel economy resulting from the provision of relatively lean mixtures at constant-speed operation or under light-load conditions and relatively rich mixtures during periods of acceleration or full-load operation. Wholly apart from the fuel economy resulting from such control, my apparatus possesses an added advantage in inhibiting the formation of carbon deposits within the cylinders of the internal combustion engine with which it is associated; for the relatively large proportion of air supplied to the engine under most operating conditions tends to insure complete combustion of the fuel supplied and may in many instances actually result in the gradual burning out of carbon deposits previously formed in the engine cylinders.

I claim as my invention:

1. In a control mechanism for regulating the position of a movable member, a pressure-responsive element operatively connected to said movable member to move it in responsive pressure changes, said pressure-responsive element being connected through a passage with a body of gaseous fluid maintained at sub-atmospheric pressure, said passage being provided with an opening through which it communicates with atmosphere, a valve for said opening, said valve being adjustable to vary the rate of fluid flow through said passage whereby to vary the pressure to which said pressure-responsive element is subjected and produce movement of said movable member, and means operative in response to member-movement for adjusting said valve to cause termination of member-movement.

2. In a control mechanism for regulating the position of a movable member, a pressure-responsive element operatively connected to said movable member to move it in response to pressure changes, said pressure-responsive element being connected through a passage with a body of gaseous fluid maintained at a pressure different from atmospheric pressure, said passage being provided with an opening through which it communicates with atmospheric, a valve for said opening, said valve being adjustable to vary the rate of fluid flow through said passage whereby to vary the pressure to which said pressure-responsive element is subjected and produce movement of said movable member, and means operative in response to member-movement for adjusting said valve to cause termination of member-movement.

3. In a control mechanism for regulating the position of a movable member, a pressure-responsive element operatively connected to said movable member to move it in response to pressure changes, said pressure-responsive element being connected through a passage with a body of gaseous fluid maintained at sub-atmospheric pressure, said passage being provided with an opening through which it communicates with atmosphere, a valve for said opening, said valve being adjustable to vary the rate of fluid flow through said passage whereby to vary the pressure to which said pressure-responsive element is subjected and produce movement of said movable member, means operative in response to movement of said member for adjusting said valve in a sense which will cause termination of member-movement, and means for varying the point in member-movement at which adjustment of said valve becomes effective to terminate member-movement.

4. In a control mechanism for regulating the position of a movable member, a pressure-responsive element operatively connected to said movable member to move it in response to pressure changes, said pressure-responsive element being connected through a passage with a body of gaseous fluid maintained at a pressure different from atmospheric pressure, said passage being provided with an opening through which it communicates with atmosphere, a valve for said opening, said valve being adjustable to vary the rate of fluid flow through said passage whereby to vary the pressure to which said pressure-responsive element is subjected and produce movement of said movable member, means operative in response to movement of said member for adjusting said valve in a sense which will cause termination of member-movement, and means for varying the point in member-movement at which adjustment of said valve becomes effective to terminate member-movement.

5. In a control mechanism for regulating the position of a throttle in the intake conduit of an internal-combustion engine, a pressure-responsive element operatively connected to said throttle to move it in response to pressure changes, said pressure-responsive element being connected through a passage with a point in said conduit posterior to said throttle, said passage being provided with an air-admitting opening, a valve for said opening, said valve being adjustable to vary the rate of fluid flow through said passage whereby to vary the pressure to which said pressure-responsive element is subjected and produce movement of said throttle, and means operative in response to throttle-movement for adjusting said valve to cause termination of throttle-movement.

6. In a control mechanism for regulating the position of a throttle in the intake conduit of an internal-combustion engine, a pressure-responsive element operatively connected to said throttle to move it in response to pressure changes, said pressure-responsive element being connected through a passage with a point in said conduit posterior to said throttle, said passage being provided with an air-admitting opening, a valve for said opening, said valve being adjustable to vary the rate of fluid flow through said passage whereby to vary the pressure to which said pressure-responsive element is subjected and produce movement of said throttle, means operative in response to movement of said throttle for adjusting said valve in a sense which will cause termination of throttle-movement, and means for varying the point in throttle-movement at which adjustment of said valve becomes effective to terminate throttle-movement.

7. In combination with the intake conduit of an internal combustion engine, a throttle in said intake conduit, means for automatically controlling said throttle including a pressure-responsive element operatively connected to said throttle, a passage connecting said pressure-responsive element to said conduit at a point posterior to said throttle, said passage being provided with an air-admitting opening, a valve associated with said air-admitting opening to modify the effect on said pressure-responsive element of pressures existing within said conduit posterior to said throttle, a manually movable member, and means controlled jointly in accordance with the respective positions of said throttle and said member for operating said valve.

8. In combination with the intake conduit of an internal combustion engine, a throttle in said conduit, a passage having an inlet opening communicating with the atmosphere and a discharge opening communicating with said conduit at a point posterior to said throttle, a valve associated with said inlet opening to control air flow through and thereby modify fluid pressure in said passage, a pressure-responsive element communicating with an intermediate point in said passage to be responsive to fluid pressure at such point, said pressure-responsive element being operatively connected to said throttle to move it toward closed position upon an increase in the fluid pressure within said passage and toward open position upon a decrease in such pressure, a manually movable member, a valve-operating mechanism controlled jointly by said throttle and movable member and operative by opening movement of the throttle or by movement of the manually movable member in one direction to open said valve and by closing movement of the throttle or by movement of the manually movable member in the opposite direction to close said valve.

9. In a control mechanism for regulating the position of a throttle within the intake conduit of an internal-combustion engine, a pressure-responsive element connected by a passage to the intake conduit to move the throttle in one direction, said passage being open whereby said pressure-responsive element will always be responsive at least in part to fluid pressure in the intake conduit, a yielding means for moving said throttle in the other direction, said passage being provided with an air-admitting opening, a valve associated with said air-admitting opening for controlling the position of said throttle, and automatic means affected by fluid pressure in the intake conduit for operating said valve.

10. In a control mechanism for regulating the position of a throttle within the intake conduit of an internal-combustion engine, a pressure-responsive element connected by a passage to the intake conduit to move the throttle in one direction, a yielding means for moving said throttle in the other direction, said passage being open whereby said pressure-responsive element will always be responsive at least in part to fluid pressure in the intake conduit, said passage being provided with an air-admitting opening, a valve associated with said air-admitting opening for controlling the responsiveness of said pressure-responsive element, and automatic means affected by fluid pressure in the intake conduit for operating said valve.

11. In combination with a branched intake conduit of an internal combustion engine, a throttle in one branch of said conduit to control the flow of gaseous fluid therethrough, a throttle in another branch of said conduit, and means for coordinating the respective velocities of gaseous fluid flow through said branches, said means including a pressure-responsive element operatively connected to one of said throttles and responsive differentially to the pressures occurring posterior to said respective throttles.

12. In combination with a branched intake conduit of an internal combustion engine, a throttle in one branch of said conduit to control the flow of gaseous fluid therethrough a throttle in another branch of said conduit, and means for co-ordinating the respective pressures and the respective flow-velocities in said branches, said means including a pressure-responsive element operatively connected to one of said throttles and responsive differentially to the pressures occurring posterior to said throttles in the respective branches, said pressure-responsive element acting to close its associated throttle whenever the pressures existing on the opposite sides of said pressure-responsive element become substantially equal.

13. In combination with a branched intake conduit of an internal combustion engine, a throttle in one branch of said conduit to control the flow of gaseous fluid therethrough, and means for controlling the flow through another branch, said means including a second throttle and a throttle-operating pressure-responsive element controlled differentially by the pressures existing within said two branches.

14. In combination with a branched intake conduit of an internal combustion engine, a throttle in one branch of said conduit to control the flow of gaseous fluid therethrough, and means for controlling the flow through another branch, said means including a second throttle and a throttle-operating pressure-responsive element controlled differentially by the pressures existing within said two branches at points therein posterior to said respective throttles.

15. In a control mechanism for regulating the position of a throttle within the intake conduit of an internal combustion engine, a pressure-responsive element connected by a passage to the intake conduit to move the throttle in one direction, a yielding means for moving said throttle in the other direction, said passage being provided with an air-admitting opening, a by-pass communicating with said conduit on opposite sides of said throttle, a second pressure-responsive element responsive to fluid pressure at an intermediate point of said by-pass, and means including a valve associated with said air-admitting opening to control the effect of the intake pressure acting on said first mentioned pressure-responsive element, said valve being controlled by said second pressure-responsive element.

16. In a control mechanism for regulating the position of a throttle within the intake conduit of an internal combustion engine, said mechanism including a throttle-controlling pressure-responsive element connected by a passage to the intake conduit, said passage being provided with an air-admitting opening, a by-pass communicating with said conduit on opposite sides of said throttle, a second by-pass discharging into said first mentioned by-pass at an intermediate point therein, a second pressure-responsive element responsive to fluid pressure at an intermediate point of said second by-pass, and means including a valve associated with said air-admitting opening to control the effect of the intake pressure acting on said first mentioned pressure-responsive element, said valve being controlled by said second pressure-responsive element.

17. In a control mechanism for simultaneously regulating the speed of a plurality of internal combustion engines, each engine having a control mechanism for regulating the position of a throttle within an intake conduit thereof, said mechanism including a pressure-responsive element connected by a passage to the intake conduit to move the throttle in one direction, a yielding means for moving said throttle in the other direction, each of said respective passages being provided with an air-admitting opening, a valve associated with each of said air-admitting openings, a device associated with each engine and responsive to the speed thereof, a single movable control member, and means associated with each valve for positioning it under joint control by said control member and the speed-responsive device of the associated engine.

18. The method of controlling an internal combustion engine, comprising supplying two streams of air to the engine, adding fuel to such air at a rate proportioned to the rate of flow of one of said air streams, and controlling the rate of flow of the other air stream jointly in accordance with engine performance and with changes in the rate of air flow in the first stream.

19. In a control mechanism for controlling the movable member of a device associated with an internal combustion engine, a pressure-responsive element connected by a passage to the intake conduit of said engine to move said movable member in one direction, a yielding means for moving said movable member in the other direction, said passage being provided with an air-admitting opening, a valve associated with said air-admitting opening whereby control exercised by said pressure-responsive element may be terminated solely by an air-bleed provided by opening of said valve, and means affected by fluid pressure in said intake conduit for opening said valve.

20. The method of controlling the air-supply to an internal combustion engine, comprising supplying two streams of air to the engine, said engine also being supplied with fuel at a rate proportioned substantially to the rate of flow of one of said air streams, and controlling the rate of flow of the other stream jointly in accordance with engine performance and with changes in the rate of air flow in the first stream.

21. In a control mechanism for controlling the movable member of an ignition timing device of an internal combustion engine, a pressure-responsive element connected by a passage to the intake conduit of said engine to move said movable member in one direction, a yielding means for moving said movable member in the other direction, said passage being provided with an air-admitting opening, and means including a valve associated with said air-admitting opening whereby the control exercised by said pressure-responsive element may be modified in accordance with an air-bleed controlled by said valve, said valve being affected by changes in speed of the engine.

22. In a control mechanism for controlling an internal combustion engine, a branched intake conduit for said engine, a throttle in one branch of said conduit, a second throttle in the other branch of said conduit, means for co-ordinating the action of said throttles including a pressure-responsive element controlled differentially by the respective pressures existing within said branches to control said first throttle, a second pressure-responsive element for regulating the position of said second throttle, said second pressure-responsive element being connected through a branched passage with a point in said second conduit-branch posterior to said throttle therein, said branched passage also being connected to said first pressure-responsive element, said branched passage being provided with an air-admitting opening, a valve for said opening, said valve being adjustable to vary the rate of fluid flow through said branched passage whereby to vary the pressure to which said pressure-responsive elements are subjected, whereby fluid flow through said passage influences said first throttle to open additionally, and said second throttle to close additionally, said control mechanism to include an ignition timer controlled by a pressure-responsive element connected by a second passage to one of said conduit-branches of said intake conduit at a point posterior to the throttle therein, said second passage having a second air-admitting opening, a second valve for said second air-admitting opening, said second valve being controlled by the position of said first throttle, and means including an element affected by speed of the engine to control said first valve, whereby the respective throttles and the ignition timer are controlled in their respective manners in accordance with the speed of the engine.

23. In a control mechanism for controlling an internal combustion engine, a branched intake conduit for said engine, a throttle in one branch of said conduit, a second throttle in the other branch of said conduit, means for co-ordinating the action of said throttles including a pressure-responsive element controlled differentially by the respective pressures existing within said branches to control said first throttle, a second pressure-responsive element for regulating the position of said second throttle, said pressure-responsive element being connected through a branched passage with a point in said second conduit-branch posterior to said throttle therein, said branched passage also being connected to said first pressure-responsive element, said branched passage being provided with an air-admitting opening, a valve for said opening, said valve being adjustable to vary the rate of fluid flow through said branched passage whereby to vary the pressure to which said pressure-responsive elements are subjected, whereby fluid flow through said passage influences said first throttle to open additionally, and said second throttle to close additionally, and means including an element affected by speed of the engine to control said first valve, whereby the current maximum quantity of gaseous fluid flow past the respective throttles will occur whenever said first valve is opened by said element affected by speed of the engine, said first valve being controlled in its open position by a state of equilibrium between power requirements for full load conditions and current power requirements from the engine to carry the load imposed on said engine at the desired speed of said engine.

24. In a control mechanism for regulating the position of a throttle within the intake conduit of an internal combustion engine, a pressure-responsive element connected by a passage to the intake conduit to move the throttle in one direction, a yielding means for moving said throttle in the other direction, said passage being provided with an air-admitting opening, a valve for said opening, and means including a fluid-pressure element controlling said valve for controlling the position of said throttle.

25. In a control mechanism for controlling the supply of gaseous fluid to an internal combustion engine having an intake conduit provided with a throttle therein, a pressure-responsive element operatively connected to said throttle, a passage connecting said pressure-responsive element to said conduit at a point posterior to said throttle, said passage being provided with an air-admitting opening, a movable control member, and means for controlling the flow of gaseous fluid through said air-admitting opening to said engine, said means including a valve controlled jointly in accordance with the respective positions of said throttle and said movable control member.

26. In a control device for regulating the air-supply to an internal-combustion engine having an intake conduit including two branches, a throttle in each branch of said conduit, a pressure-responsive element operatively connected to one of said throttles and communicating through passages with both said branches to be differentially responsive to the respective pressures therein at points posterior to the respective throttles, one of said passages being provided with an air-admitting opening, and means including a valve associated with said air-admitting opening to modify the effect on said pressure-responsive element of the posterior-throttle pressure in the associated branch.

27. In combination with the intake conduit of an internal-combustion engine, a throttle in said conduit, a pressure-responsive element operatively connected to said throttle, a passage connecting said pressure-responsive element with a point in said conduit posterior to the throttle, said passage being provided with an air-admitting opening, a valve associated with said opening and movable in a first direction to so modify the effect on the pressure-responsive element of pressure within said conduit that the throttle will tend to close and in a second direction to so modify the effect of conduit-pressure on the pressure-responsive element that the throttle will tend to open, and means affected by fluid pressure in said intake conduit for moving said valve in said first direction upon an increase in the speed of the engine, the bleeding of air past said valve constituting the sole action controlled by said last named means and effective to exert said pressure-modifying effect.

28. In a control mechanism for regulating the position of a throttle within the intake conduit of an internal-combustion engine, a pressure-responsive element connected by a passage to the intake conduit to open the throttle in response to a decrease in the fluid pressure within said intake conduit, a yielding means for urging said throttle toward closed position, said passage being provided with an air-admitting opening, a loaded valve associated with said air-admitting opening to modify the effect on said pressure-responsive element of pressures existing within said conduit posterior to said throttle, a movable member for varying the load on said valve, and means affected by engine speed changes for controlling the operation of said valve, the bleeding of air past said valve constituting the sole action controlled by said last named means and effective to exert said pressure-modifying effect.

29. In a control mechanism for regulating the position of a movable member, a pressure-responsive element operatively connected to said movable member to move it in response to pressure changes, said pressure-responsive element being connected through a passage with a body of gaseous fluid maintained at a pressure different from atmospheric pressure, said passage being provided with an opening through which it communicates with the atmosphere, a valve for controlling said opening to vary the rate of fluid-flow through said passage whereby to vary the pressure to which said pressure-responsive element is subjected and produce movement of said movable member, and a plurality of independently controlled devices functioning jointly to control said valve.

30. In a control mechanism for regulating the positions of a plurality of movable members, a plurality of pressure-responsive elements operatively connected to said movable members to move them in response to pressure changes, each of said pressure-responsive elements being connected through a passage with a body of gaseous fluid maintained at a pressure different from atmospheric pressure, each of said passages being provided with an opening through which it communicates with atmosphere, and a common control means for all of said passages, said means being adjustable to vary the rate of fluid flow through each of said passages whereby to vary the pressure to which each of said pressure-responsive elements is subjected and control the position of the associated movable member.

31. In a control mechanism for regulating the positions of a plurality of movable members, a plurality of pressure-responsive elements operatively connected to said movable members to move them in response to pressure changes, said pressure-responsive elements being connected through a passage with a body of gaseous fluid maintained at a pressure different from atmospheric pressure, said passage being provided with an opening through which it communicates with atmosphere, a valve for said opening, and means for automatically adjusting said valve to vary the rate of fluid flow through said passage whereby to vary the pressures to which said pressure-responsive elements are subjected and thereby control the respective positions of said movable members.

32. In a control mechanism for regulating the supply of gaseous fluid to an internal combustion engine having an intake conduit provided with a throttle therein, a pressure-responsive element operatively connected to said throttle, a passage connecting said pressure-responsive element to said conduit at a point posterior to said throttle, said passage being provided with an air-admitting opening, an additional passage having an air-admitting opening therein and connected to said intake conduit, valves for both of said air-admitting openings, and means operatively connected to said valves and affected by the speed of the engine for controlling in common the flow of gaseous fluid through said air-admitting openings to said engine.

33. In a control mechanism for regulating the supply of gaseous fluid to an internal combustion engine having an intake conduit provided with a throttle therein, a pressure-responsive element operatively connected to said throttle, a passage connecting said pressure-responsive element to said conduit at a point posterior to said throttle, said passage being provided with an air-admitting opening, an additional passage having an air-admitting opening therein and connected to said intake conduit, a movable control member, and apparatus for controlling the flow of gaseous fluid through said air-admitting openings to said engine, said apparatus including a valve means operable in common and controlled jointly in accordance with the respective positions of said throttle and said movable control member.

34. In a multiple control mechanism for regulating the minimum pressure drop of a stream of gaseous fluid being supplied to an internal combustion engine through an intake conduit provided with anterior and posterior flow-controlling valves spaced apart along said conduit, a first pressure-responsive element operatively connected to the anterior valve, passage means communicating with said element for rendering it responsive to changes in fluid pressure at a point in the conduit posterior to the anterior valve, a second pressure-responsive element operatively connected to said posterior valve, a second passage means communicating with said second element for rendering it responsive to changes in fluid pressure at a point in the conduit posterior to the anterior valve, one of said passage means having an air-bleed opening, and means for modifying the relation between the effects of changes in fluid pressure within said conduit on movements of the respective valves, said last named means comprising a valve controlling said air-bleed opening.

35. In a multiple control mechanism for regulating the minimum pressure drop of a stream of gaseous fluid being supplied to an internal combustion engine through an intake conduit provided with anterior and posterior flow-controlling valves spaced apart along said conduit, a first pressure-responsive element operatively connected to the anterior valve, passage means communicating with said element for rendering it responsive to changes in fluid pressure at a point in the conduit posterior to the anterior valve, a second pressure-responsive element operatively connected to said posterior valve, a second passage means communicating with said second element for rendering it responsive to changes in fluid pressure at a point in the conduit posterior to the anterior valve, said second passage means having an air-bleed opening, and means for modifying the relation between the effects of changes in fluid pressure within said conduit on movements of the respective valves, said last named means comprising a valve controlling said air-bleed opening.

36. In a control mechanism for regulating the position of a throttle in the intake conduit of an internal combustion engine, yielding means for moving said throttle in one direction, and pressure-responsive mechanism for moving said throttle in the opposite direction, said pressure-responsive mechanism including a pair of chambers and a movable element operatively connected to said throttle and subjected to a force proportional to the difference between the respective fluid pressures in said chambers, passages connecting said chambers respectively with points in the intake conduit posterior to the throttle, the passage associated with that chamber in which an increase in fluid pressure tends to move the throttle in opposition to said yielding means being provided with an air-bleed opening, and a valve controlling said opening.

HAROLD W. MEADE.

REFERENCES CITED

The following references are of record in the file of this patent:

UNITED STATES PATENTS

| Number | Name | Date |
|---|---|---|
| 1,552,995 | McKenzie-Martyn | Sept. 8, 1925 |
| 1,829,078 | Winterlin | Oct. 27, 1931 |
| 1,889,295 | Rosatelli | Nov. 29, 1932 |
| 2,157,472 | Bellis | May 9, 1939 |
| 2,224,600 | Howard | Dec. 10, 1940 |
| 2,268,490 | Mallory | Dec. 30, 1941 |
| 2,362,655 | Mallory | Nov. 14, 1944 |
| 2,376,732 | Strebinger | May 22, 1945 |
| 2,395,748 | Mallory | Feb. 26, 1946 |
| 2,424,836 | Mallory | July 29, 1947 |